(12) United States Patent
Nuss et al.

(10) Patent No.: US 10,300,822 B2
(45) Date of Patent: May 28, 2019

(54) HEADREST

(71) Applicant: GRAMMER AG, Amberg (DE)

(72) Inventors: Ralph Nuss, Poppenricht (DE);
Gerhard Delling, Schmidgaden (DE);
Manfred Schlierf, Amberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 15/860,774

(22) Filed: Jan. 3, 2018

(65) Prior Publication Data

US 2018/0222368 A1 Aug. 9, 2018

(30) Foreign Application Priority Data

Feb. 8, 2017 (DE) ........................ 10 2017 001 149

(51) Int. Cl.
| | |
|---|---|
| *B60N 2/853* | (2018.01) |
| *B60N 2/812* | (2018.01) |
| *B60N 2/841* | (2018.01) |
| *B60N 2/865* | (2018.01) |
| *B60N 2/888* | (2018.01) |
| *B60N 2/874* | (2018.01) |
| *B60N 2/80* | (2018.01) |

(52) U.S. Cl.
CPC ............. *B60N 2/853* (2018.02); *B60N 2/812* (2018.02); *B60N 2/841* (2018.02); *B60N 2/865* (2018.02); *B60N 2/874* (2018.02); *B60N 2/888* (2018.02); *B60N 2002/899* (2018.02)

(58) Field of Classification Search
CPC ........ B60N 3/853; B60N 2/874; B60N 2/841; B60N 2/865; B60N 2/888

USPC .......................................................... 297/409
See application file for complete search history.

(56) References Cited

U.S. PATENT DOCUMENTS

| | | | | |
|---|---|---|---|---|
| 4,366,985 | A | * | 1/1983 | Leffler ................. A61G 15/125 297/409 |
| 9,566,884 | B2 | | 2/2017 | Line |
| 2012/0001461 | A1 | * | 1/2012 | Alexander ............. B60N 2/876 297/216.12 |
| 2015/0375650 | A1 | * | 12/2015 | Talamonti ............. B60N 2/874 297/409 X |

FOREIGN PATENT DOCUMENTS

| | | |
|---|---|---|
| DE | 8717439 U | 11/1988 |
| DE | 19961618 B | 4/2001 |
| DE | 102014214897 A | 2/2016 |
| GB | 2283163 A | 5/1995 |

* cited by examiner

*Primary Examiner* — Anthony D Barfield
(74) *Attorney, Agent, or Firm* — Andrew Wilford

(57) ABSTRACT

A headrest for a vehicle seat has a head support and a mounting assembly carrying the head support on a vehicle seat and comprising a four-pivot linkage having an upper holding element on the head support and a lower holding element fixed to the seat. First and second links interconnect the upper holding element at respective first and second upper pivots on the upper holding element and the lower holding element at respective first and second lower pivots on the lower holding element. Thus the four-pivot linkage can shift the head support relative to the vehicle seat between a front position moved forward toward the head of a seat occupant, and a rear position moved backward therefrom. The upper are at a different relative horizontal spacing on the upper holding element than the lower pivots on the lower holding element.

8 Claims, 11 Drawing Sheets

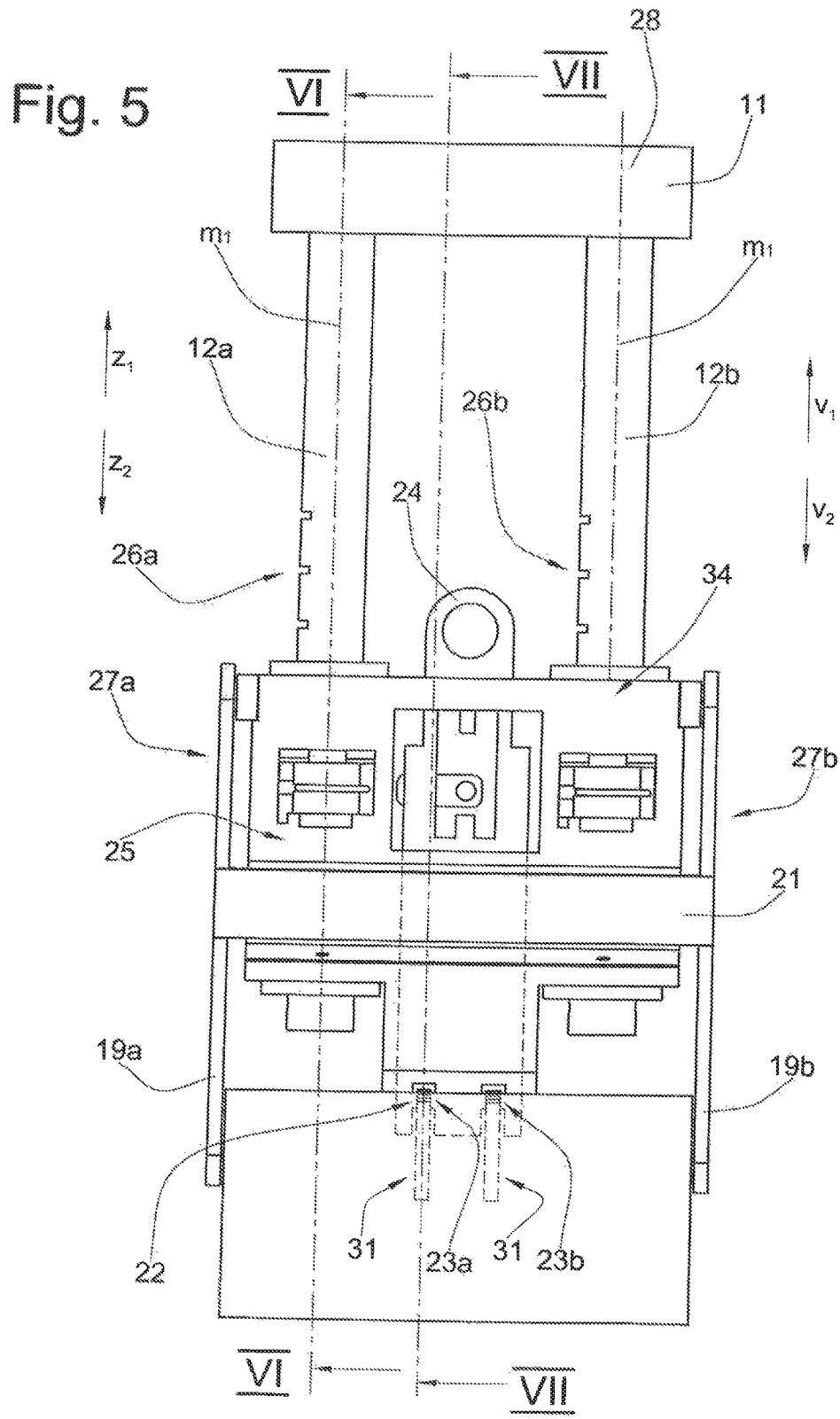

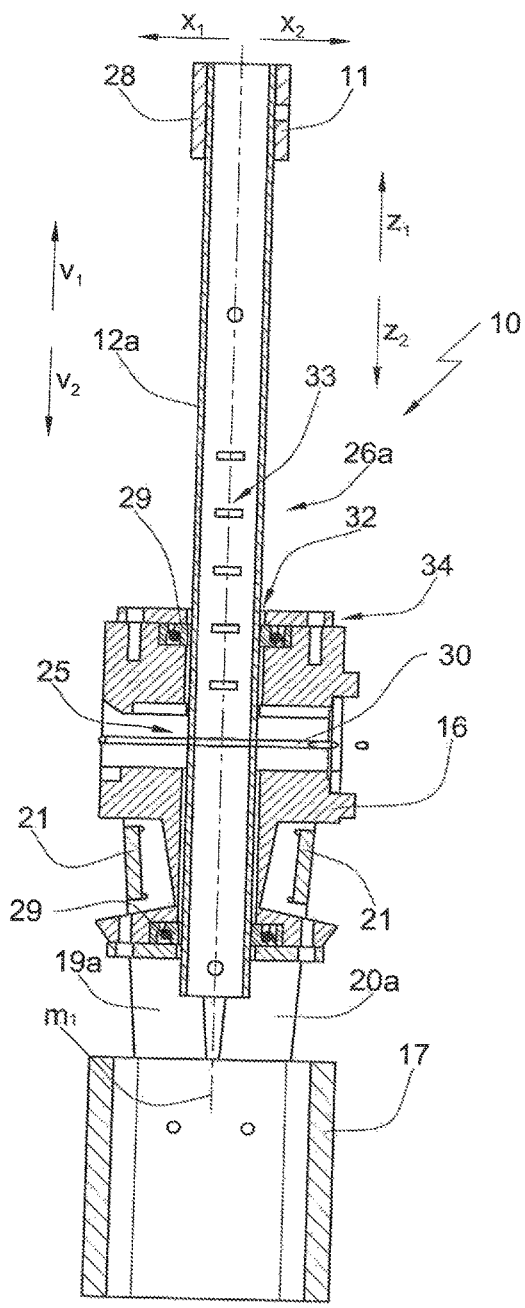
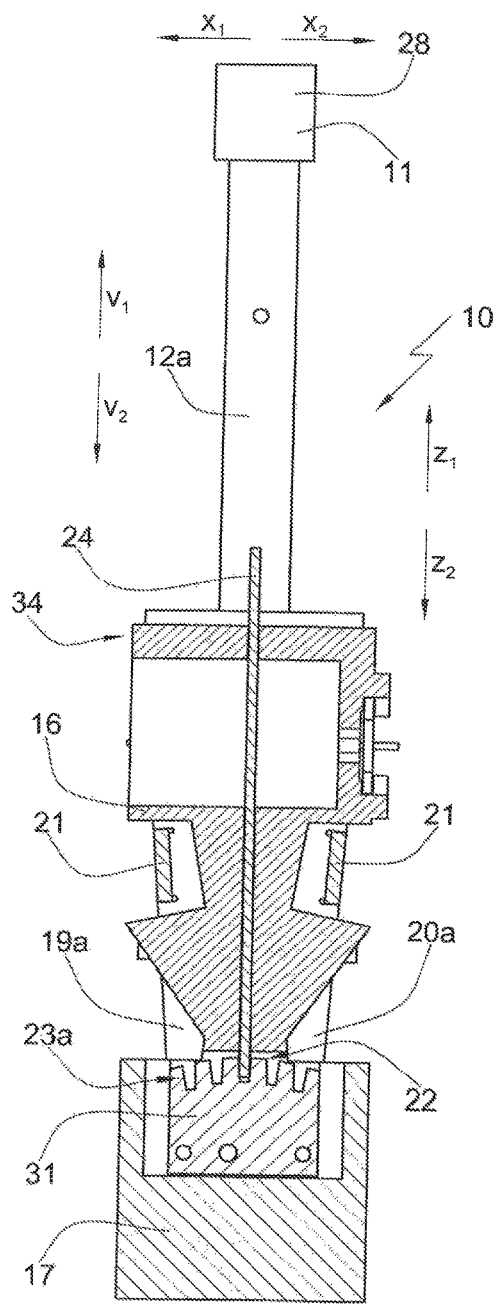

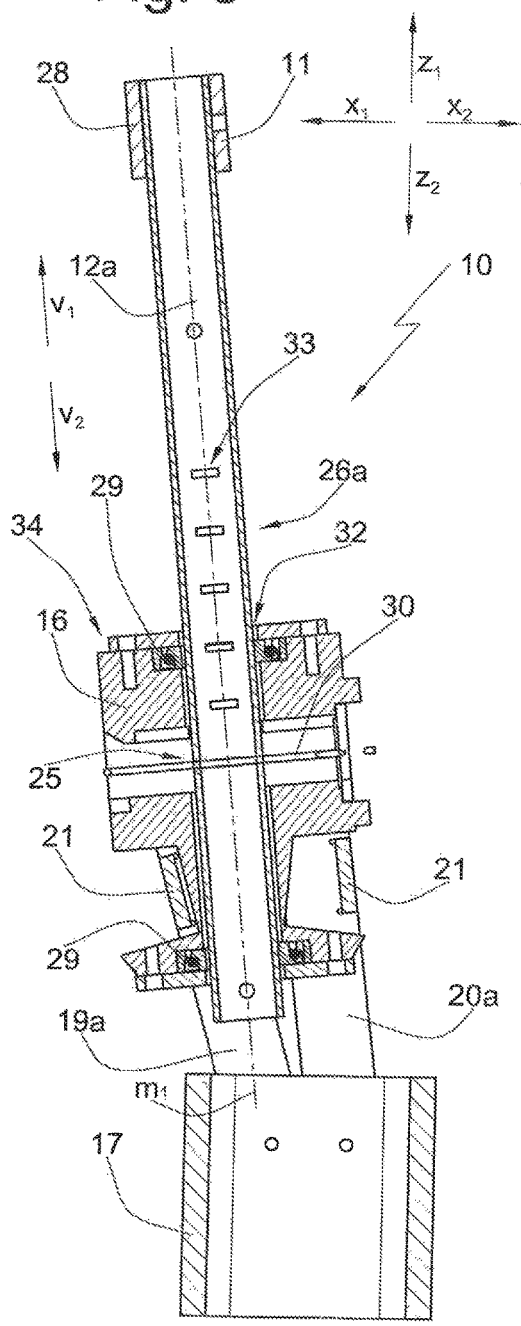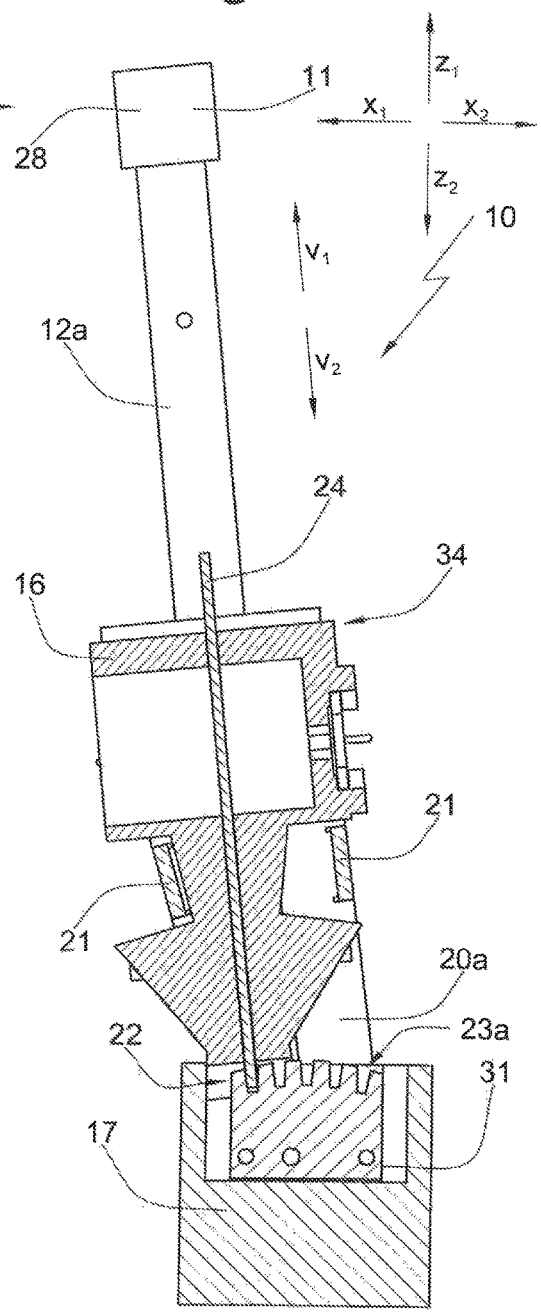

HEADREST

FIELD OF THE INVENTION

The invention relates to a headrest, in particular a headrest for a vehicle seat.

BACKGROUND OF THE INVENTION

The headrest comprises a head part held on the backrest of a vehicle seat by a mounting assembly. The mounting assembly comprises a first holder on the backrest, and a second holder on the head part. The head part is supported so as to be vertically movable and in the horizontal direction by the mounting assembly.

A headrest from the prior art is described in DE 10 2015 206 956 [U.S. Pat. No. 9,566,884]. The headrest comprises a head support supported on a support bar bracket by two four-pivot linkages. The support bar bracket is fixedly held on the backrest of a vehicle seat. The head support can be moved forward and backward horizontally with the help of the four-pivot linkage. A head support element, on which the head support is guided in a vertically movable manner, is fastened to upper ends of the connecting members of the four-pivot linkage that run vertically. A front side section of the headrest element is thereby arranged upstream of the four-pivot linkages.

A patient chair is described in DE 87 17 434, in the case of which the head support is supported in a horizontally and vertically movable manner similarly as in the case of the above-mentioned publication. In this prior art, the spacing of the upper and of the lower pivots differs, so that the pivoting of the linkage arms is associated with a pivoting of the head support.

An adjusting device for the headrest of a vehicle seat that comprises a four-pivot linkage embodied as parallelogram, is described in DE 10 2014 214 897.

OBJECT OF THE INVENTION

It was the object of the invention to create a headrest comprising a narrow head support that can be shifted ventrally and in the X-direction.

SUMMARY OF THE INVENTION

The headrest according to the invention comprises a head support that can be supported on a seat by a mounting assembly. The mounting assembly comprises a linkage comprising a first or upper holding element on the head support, and a second or lower holding element fixed to the seat part. The second holding element is fastened, for example fixedly, to the structure of the backrest. The head support is connected to the first holding element, for example directly or indirectly. For example, the head support has support bars that are supported in the first holding element in an movable, in particular vertically, or fixed manner.

The first holding element and the second holding element are connected to one another by links in such a way that at least one four-pivot linkage is formed. The first holding element can be moved relative to the second holding element in this way between a rear position and a front position, whereby it is positively guided. Because the head support is connected to the first holding element, it can be moved relative to the vehicle seat between a front position moved forward toward the head of a seat occupant, and a rear position moved away from the head.

According to one embodiment, each four-pivot linkage comprises a first link and a second link, and each link forms a pivot with the first holding element and with the second holding element. For example, the links extend substantially vertically, between the first holding element and the second holding element. In terms of the invention, a link is a bend-resistant strut that is part of the coupling mechanism that forms the four-pivot linkage.

According to a special embodiment of the invention, the four-pivot linkage is a trapezoidal four-pivot linkage. In this case, the spacing of the two pivots that are formed on the first holding element, differ from the spacing of the pivots formed on the second holding element.

A special embodiment of the trapezoid four-pivot linkage is characterized in that the spacing of two pivots formed on the first holding element is larger than the spacing of two pivots formed on the second holding element. Thus the first holding element pivots when moving in the longitudinal direction on displacement of the linkage between the front position and the rear position.

The linkage pivots about a variable momentary axis of rotation. The momentary axis of rotation is formed by the point of intersection of center lines through the upper and lower pivots of each link. In other words, the momentary axis of rotation can be constructed in that the bearing points of each link are connected to a line and are extended downward to a point of intersection, and the points of intersection of both four-pivot linkages are connected to one another. A particularly narrow construction is possible with this arrangement, because the first holding element or a height-adjusting device that may be present, wobbles inside the four-pivot linkage. If the mounting assembly comprises support bars, a lower end of the support bars does not protrude forward or backward, for example, beyond the four-pivot linkage.

One embodiment is characterized in that the first holding element and the second holding element are part of a first four-pivot linkage and of a second four-pivot linkage. To increase the stability, the first holding element and the second holding element can be connected to one another, for example on both sides with two links each. The links are arranged in parallel, for example on both sides. The mounting assembly then comprises two four-pivot linkages, by means of which the first holding element and thus also the head support are guided in a stable manner.

The linkage comprises an electrical drive, for example, that can move the linkage between the rear position and the front position. When using the electrical drive, the linkage can be locked in different positions by a latch that will be described below. In the alternative, the electrical drive can be self-locking, so that an additional locking is not necessary. Due to the self-locking, the linkage then remains in the position that is in each case set by the electrical device.

According to one embodiment, the linkage comprises a latch, that can lock the first holding element in different positions in response to the movement between the front position and the rear position. For example, the latch comprises first locking means that are on the first holding element, and second locking means that are on the second holding element. The first locking means and the second locking means can be releasably engaged with one another.

When the locking means are engaged in a locked position, the first holding element, and thus the head support, cannot be moved between the front and the rear position. If they are disengaged in a released position, the first holding element can be moved between the rear and the front position. To move the latch between the locked position and the released position, the first locking means and/or the second locking means are embodied in a movable manner.

The second locking means protrude in the direction of the first locking means, for example to the extent that favorable lever and translatory ratios are obtained, so as to move the locking means between the locked position and the released position. The second locking means are embodied in such a way, for example, that they do not protrude from the linkage in any of the positions thereof.

The mounting assembly comprises a height-adjusting device, for example, that can move the head support relative to the vehicle seat between an upper position and a lower position. The headrest can optionally have a height-adjusting device, i.e. according to one embodiment alternative, the headrest can be embodied without height-adjusting device, and, according to another embodiment alternative, with height-adjusting device.

For example, the height-adjusting device comprises at least one support bar connected to the head support, and at least one guide on the first holding element, for storing and guiding the support bar. In the alternative, however, other guides, such as, for example, the guide for the head support on a sheet metal fixed to the backrest, a ball guide, or a slide rail guide, can be used instead of support bars. For example, the guide is formed by a linear guide or a curved guide, in which the head support is guided.

For example, the support bar is fixedly connected to the head support. For example, two support bars are connected to the head support. For each support bar, provision is made for one guide on the first holding element. For example, the guide is formed in the first holding element. For example, at least one recess, in which the support bar is guided, is formed in the first holding element. In the alternative, the guide is fastened for example to the first holding element.

For example, the height-adjusting device can comprise an electrical drive, so that the support bars with the head support are moved by the drive. When using the electrical drive, the support bars can also be locked in different height positions by a locking mechanism that will be described below. In the alternative, the electrical drive can be self-locking, so that an additional locking is superfluous. The support bar then remains in the position that is in each case adjusted by the electrical drive.

One embodiment is characterized in that provision is made for a locking mechanism that can lock the head support relative to the vehicle seat, in particular relative to the first holding part, in different height positions. For example, the locking mechanism comprises first locking means that are on the first holding element, and second locking means that are on the support bar. In a locked position, the locking means are engaged and the movement of the support bar is not possible in at least one direction. In the locked position, for example the movement of the support bar in both directions may not be possible. In an adjustment position, the movement of the support bar is possible in both directions of movement.

BRIEF DESCRIPTION OF THE DRAWING

Further advantages follow from an exemplary embodiment that is illustrated schematically in the figures.

FIG. 5 is a front view of the headrest according to view arrow V in FIG. 3, wherein the linkage is located in the middle position and the height-adjusting device is located in the upper position.

FIG. 6 is a sectional view according to sectional line VI-VI in FIG. 5.

FIG. 7 is a sectional view according to sectional line VII-VII in FIG. 5.

FIG. 8 shows the headrest as in FIG. 6 in the front position of the linkage.

FIG. 9 shows the headrest as in FIG. 7 in the front position of the linkage.

SPECIFIC DESCRIPTION OF THE INVENTION

Figure 1:
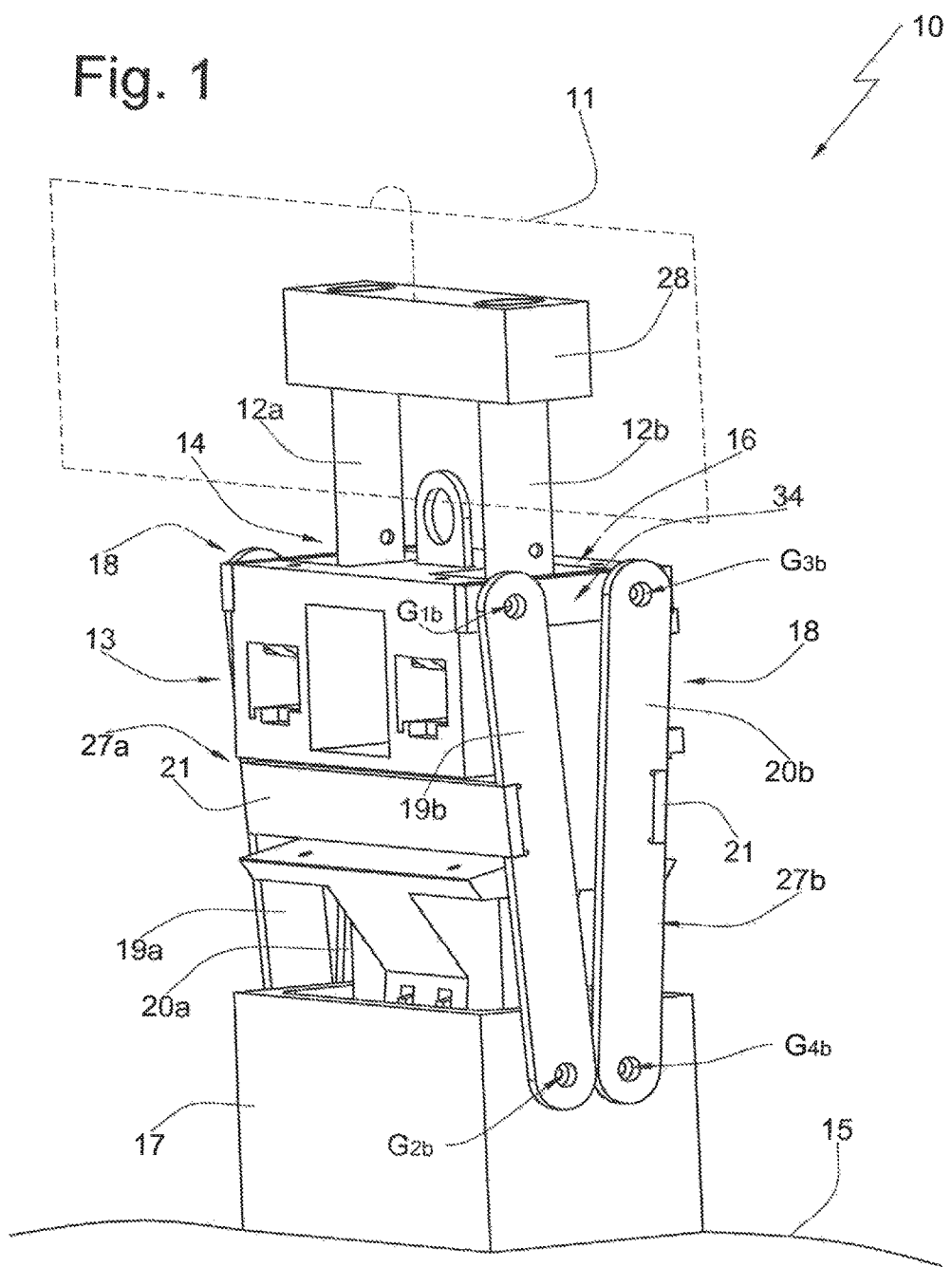
FIG. 1 is a perspective view of the headrest, including a mounting assembly, wherein a linkage is in a middle position and a height-adjusting device is in a lower position.

The headrest as a whole is identified with reference numeral 10 in the figures. Identical reference numerals in the different figures identify corresponding parts, even if followed by lower-case letters or if they are omitted.

The headrest 10 comprises a head support 11 illustrated schematically only in FIG. 1 by a dashed line and which is suggested by a connecting area 28 that is part of the head support 11, in the remaining figures. The connecting area 28 of the head support 11 is fixedly connected to support bars 12a and 12b. The support bars 12a and 12b are part of a mounting assembly 13 that supports the head support 11 so as to be movable relative to a vehicle seat 15 in the directions $x_1$ and $x_2$ and in the directions $z_1$ and $z_2$, as can be seen, for example, in FIGS. 1 to 4. The directions $x_1$ and $x_2$ are parallel to an x-axis, and the directions $z_1$ and $z_2$ are parallel to a z-axis of a coordinate system fixed in space, of x-axis, y-axis and z-axis.

The mounting assembly 13 comprises a height-adjusting device 14 and a linkage 18. The linkage 18 comprises a first holding element 16 and a second holding element 17. The second holding element 17 is fixedly connected to the backrest of the vehicle seat 15. The first holding element 16 and the second holding element 17 are part of two four-pivot linkages 27a and 27b formed on opposite side areas of the first holding element 16 and of the second holding element 17.

The four-pivot linkage 27a comprises links 19a and 20a that run vertically, and the four-pivot linkage 27b comprises links 19b and 20b. The links 19a and 19b and the links 20a and 20b are connected to one another by cross-bars for stabilizing purposes. The cross-bars 21 are fixedly fastened to the links 19a and 19b or to the links 20a and 20b, respectively.

The link 19a forms a pivot G1a with the first holding element 16, and a pivot G2a with the second holding element 17. The link 20a forms a pivot G3a with the first holding element 16, and a pivot G4a with the second holding element 17. In the same way, the link 19b forms a pivot G1b with the first holding element 16, and a pivot G2b with the second holding element 17. The link 20b forms a pivot G3b with the first holding element 16, and a pivot G4b with the second holding element 17.

The pivots G1a, G3a, G1b and G3b are arranged for example on an upper end area 34 of the holding element 16. The first holding element 16 can be moved relative to the second holding element 17 in this way between a rear position and a front position by the linkage 18—regardless of the height position of the head support 11 or of the position of the support bars 12a and 12b, respectively (see for example FIG. 10).

Figure 10:
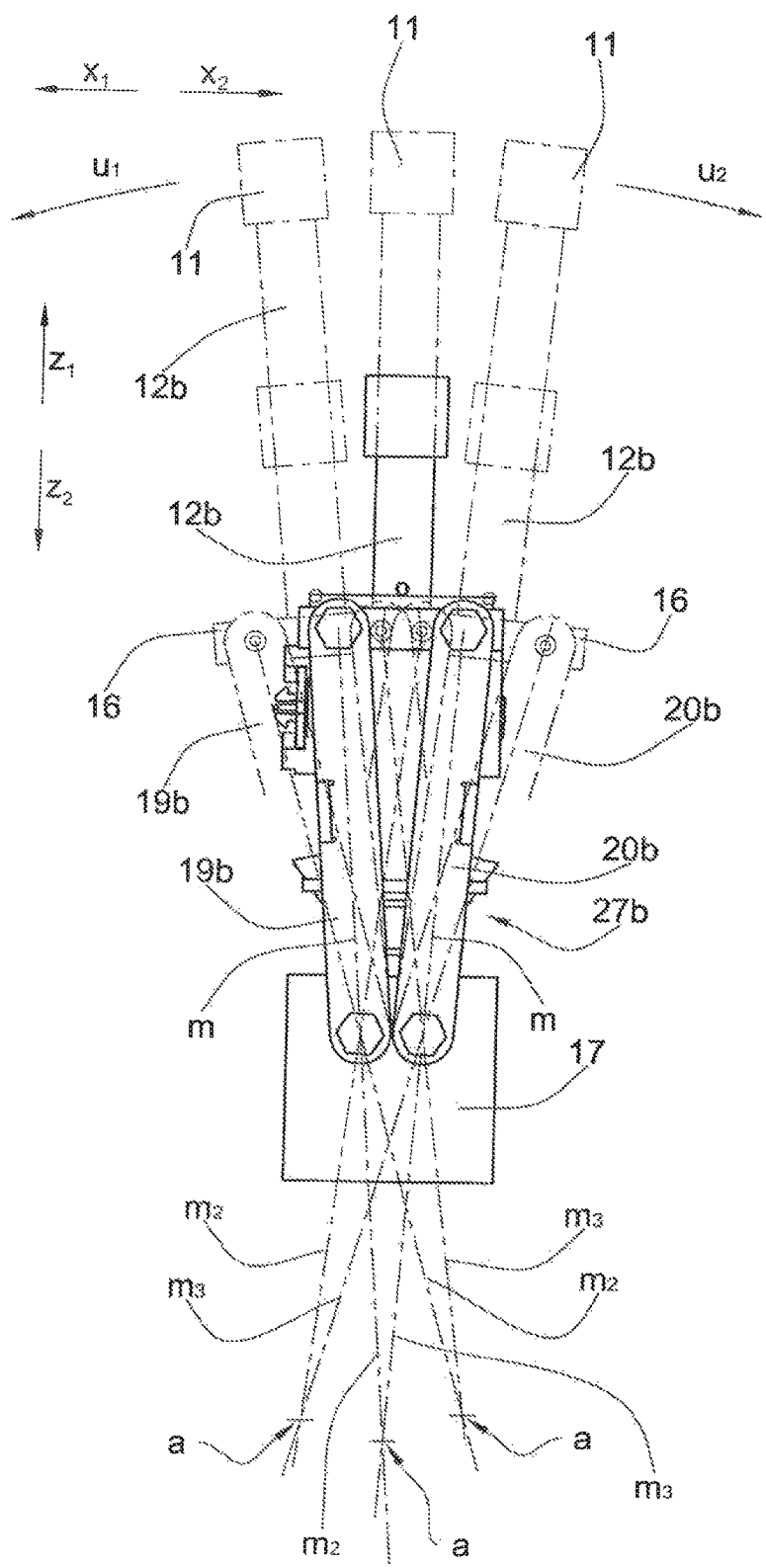
FIG. 10 is a side view of the headrest, wherein the linkage is illustrated in a rear position, the middle position and the front position, wherein the height-adjusting device is shown in an upper and a lower position in each of the mentioned positions of the linkage.
Figure 11:
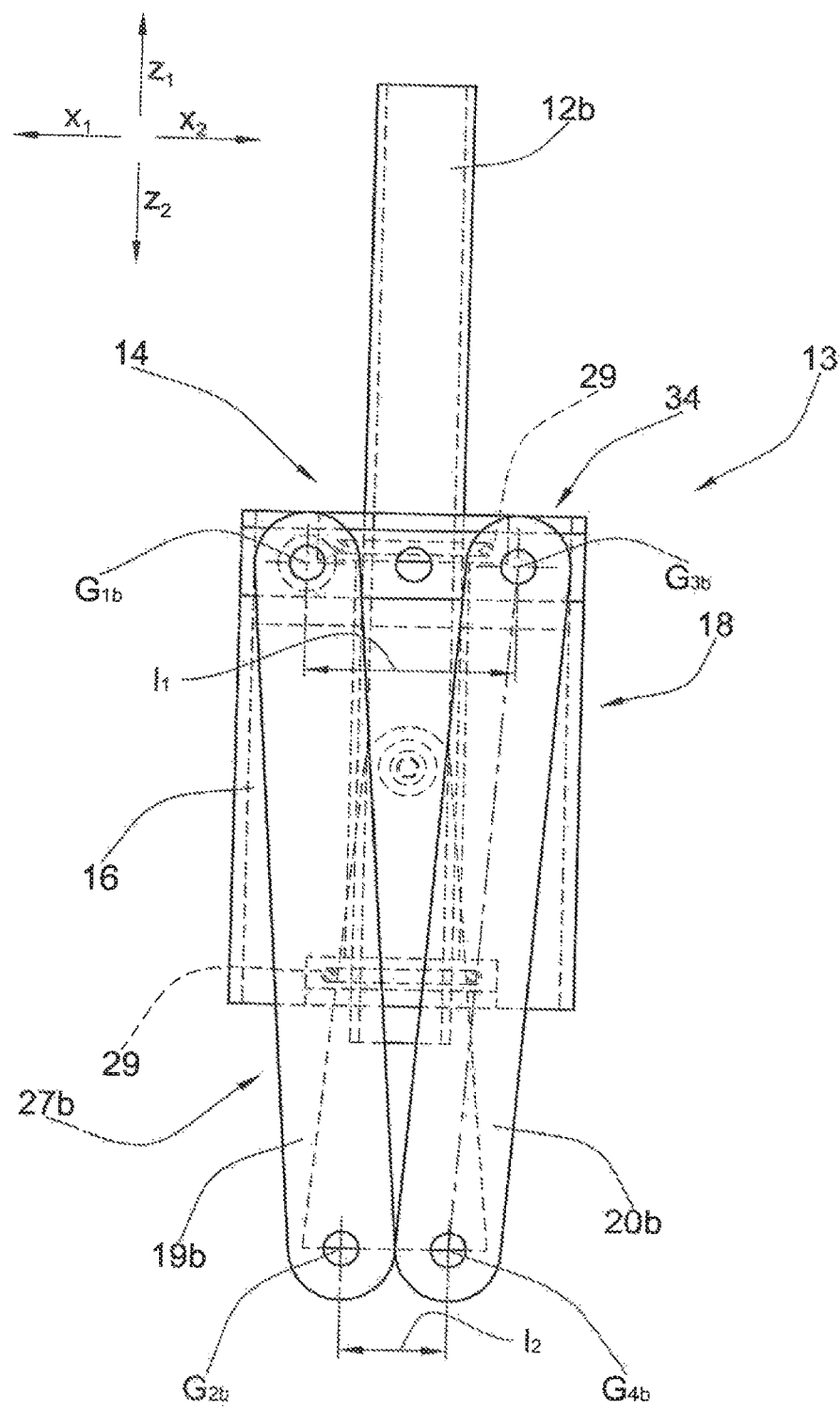
FIG. 11 is a side view of the mounting assembly, wherein the linkage of the headrest is in the middle position and wherein the support bars are arranged in the lower position.

It can be seen in FIG. 11, for example, that the spacing I1 between the pivots G1b and G3b is larger than the spacing 12 between the pivots G2b and G4b. The four-pivot linkages 27a and 27b are formed as trapezoid four-pivot linkages. The first holding element 16 is moved and inclined into the front position in the direction $x_1$ or $x_2$ in this way in response to the movement of the linkage 18 between the rear position (see FIGS. 6 and 7). In FIGS. 1, 3, 5, 6, 7 and 11, the linkage 18 is in the middle position, and in FIGS. 2, 4, 8, 9, 12 and 13, the linkage 18 is in a front position. A rear position, the middle position, and the front position of the linkage 18 are illustrated in FIG. 10.

A longitudinal center line $m_1$ of the support bars 12a and 12b coincides with a longitudinal center line of the recesses 32. A momentary axis of rotation a of the linkage 18 (see FIG. 10) is formed by the point of intersection of center lines $m_2$ and $m_3$ by the upper pivot and the lower pivot of each link 19a and 20a and 19b and 20b. In response to the movement between the front and the rear position, the support bars 12a and 12b are pivoted in the direction $u_1$ or $u_2$, respectively, wherein the head support 11 is displaced in the directions $x_1$ or $x_2$, respectively. The linkage 18 can be loaded into the front position or into the rear position, for example by a return device, such as, e.g., a spring.

The linkage 18 has a latch 22. The latch 22 comprises abutment elements 31 that are fixedly connected to the second holding element 17, comprising teeth 23a and 23b (see, e.g., FIGS. 5, 7 and 9) that cooperate with a bolt 24 held on the first holding element 16. The bolt 24 is supported in the first holding element 16 in the directions $v_1$ and $v_2$ so as to be movable between a released position and a locked position.

A non-illustrated operating element for the bolt 24 could for example be arranged on the head support 11. If the latter can be moved with a height adjustment in the directions $z_1$ and $z_2$—as in the exemplary embodiment at hand—an unlocking movement of the operating element could be transferred from the operating element to the bolt 24 by a coupling member. According to an alternative, the operating element, however, could also be arranged on the linkage.

The directions $v_1$ and $v_2$ are fixed on the first holding element 16. They thus move with the first holding element 16 in the different positions of the linkage 16. In the locked position, the bolt 24 engages with the teeth 23a and 23b. A movement of the linkage 18 between the front position and the rear position is not possible in the locked position.

In the released position (not illustrated), the bolt 24 is disengaged from the teeth 23a and 23b. The first holding element 16 can be moved between the front position and the rear position. The bolt 24 is loaded into the locked position, for example by a return element (not illustrated) in the direction $v_2$. The user can move the bolt 24 from the locked position into the released position by displacement in the direction $v_1$. The adjustment of the latch between the locked position and the released position and/or the adjustment of the linkage between the rear position and the front position can occur automatically by at least one electrical drive.

Figure 2:
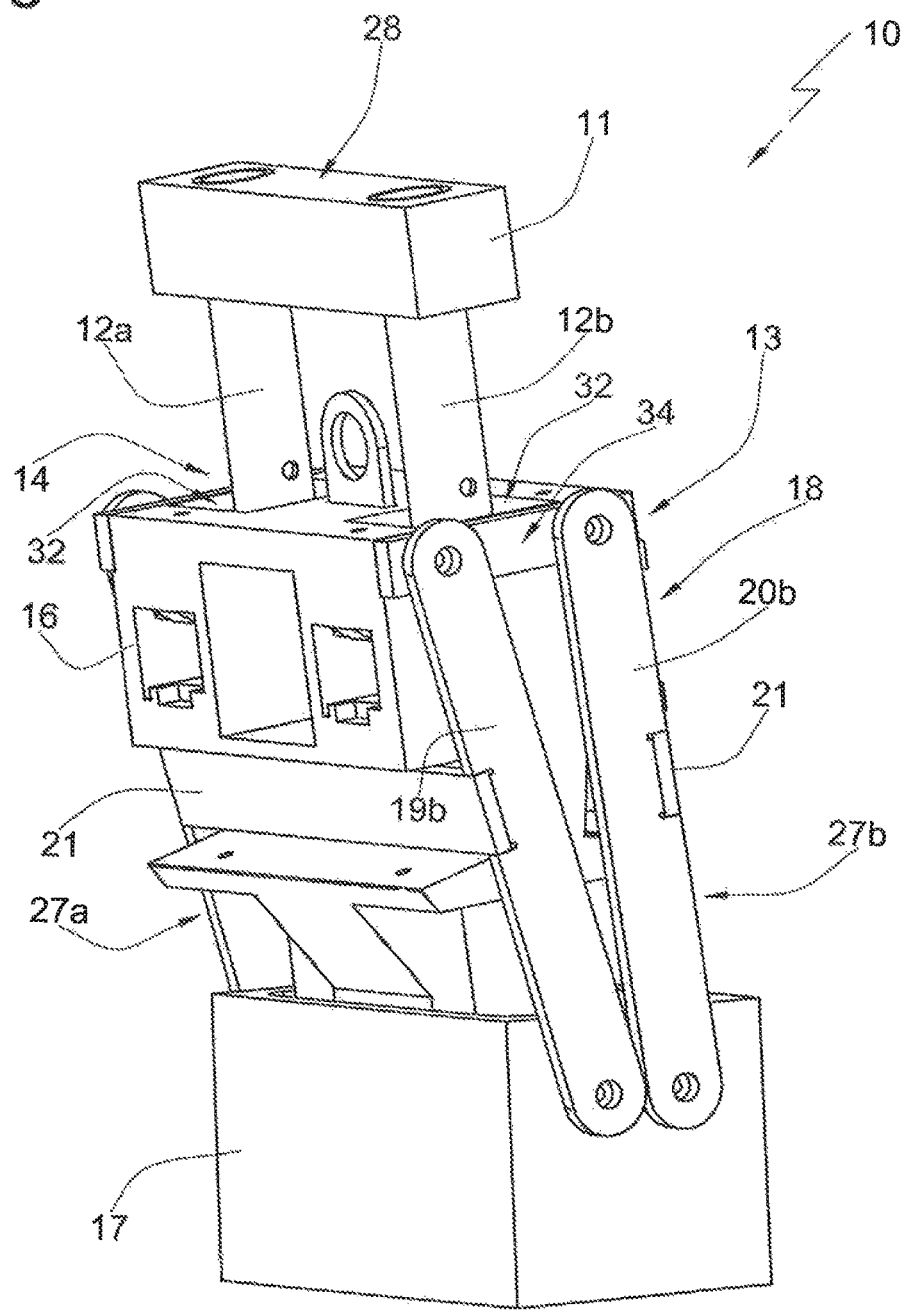
FIG. 2 shows the headrest as in FIG. 1, wherein the linkage is in a front position.
Figure 3:
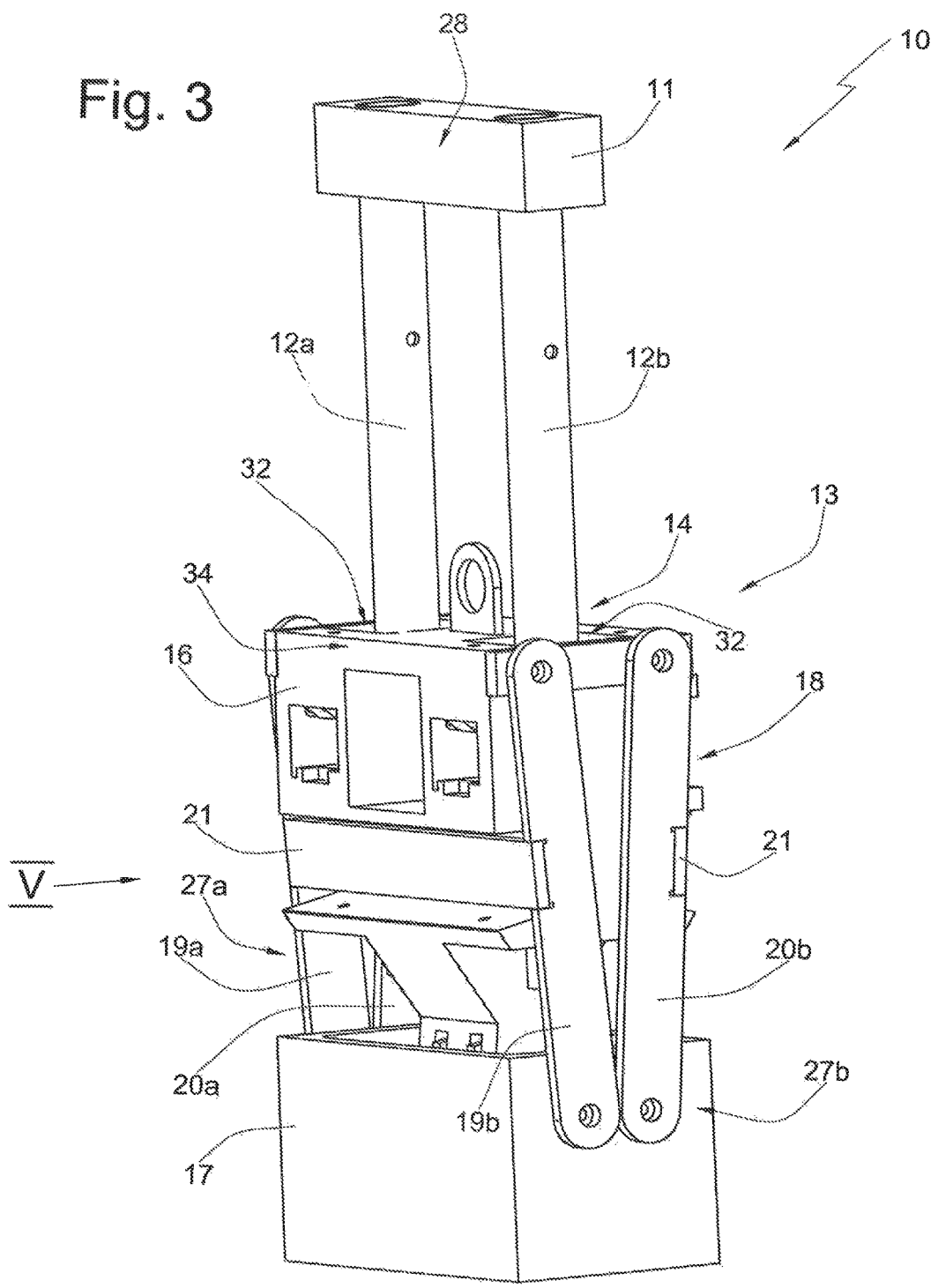
FIG. 3 shows the headrest as in FIG. 1, wherein the height-adjusting device is in an upper position.
Figure 4:
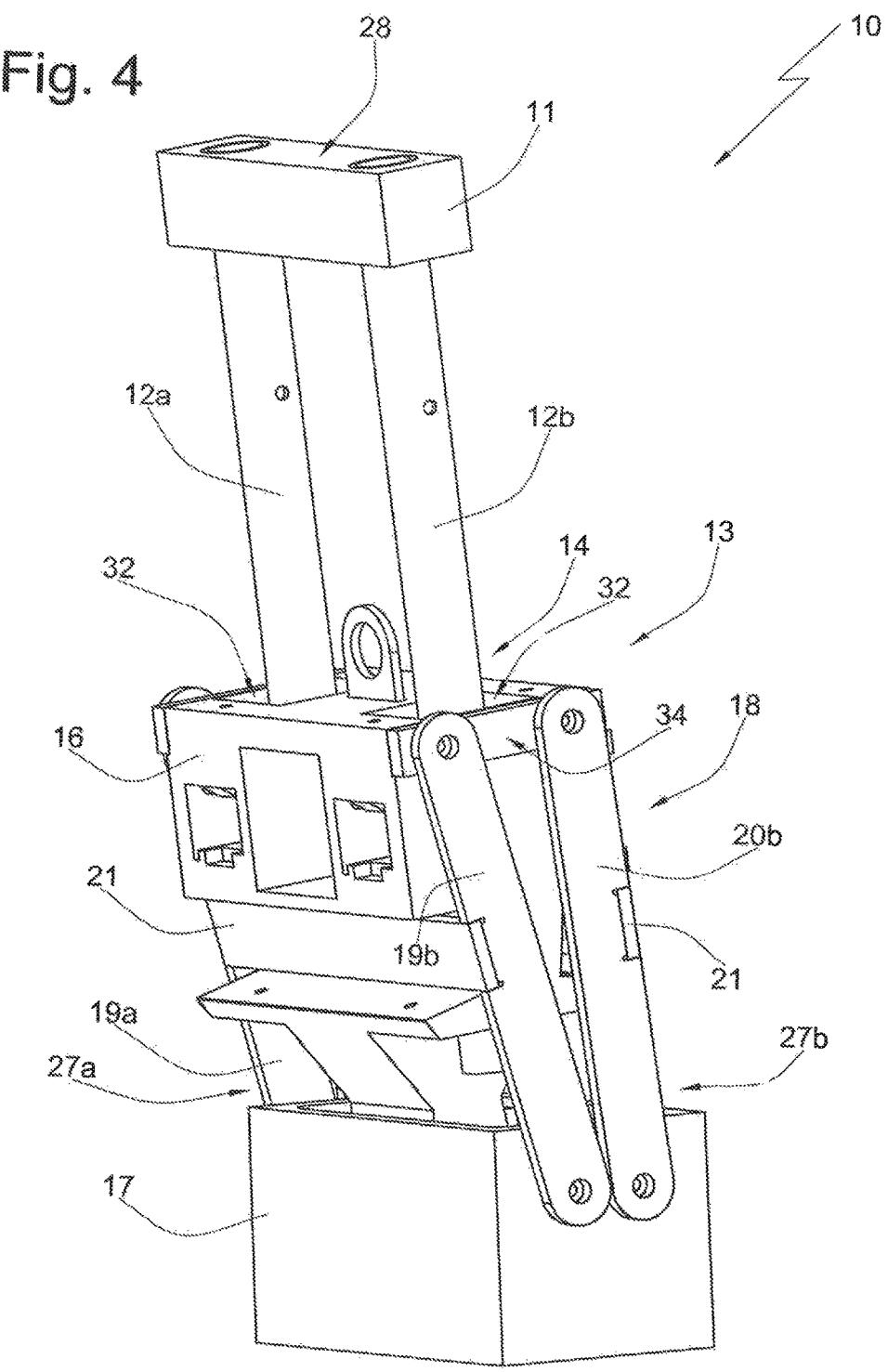
FIG. 4 shows the headrest as in FIG. 2, wherein the height-adjusting device is in an upper position.

Regardless of the position of the linkage 18, the support bars 12a and 12b can be adjusted relative to the first holding element 16 in the directions $v_1$ or $v_2$ between the lower position illustrated for example in FIGS. 1 and 2, and the upper position illustrated, for example, in FIGS. 3 and 4, by the height-adjusting device 14. In the middle position of the linkage 18, the directions of movement $v_1$ and $v_2$ coincide with the directions $z_1$ and $z_2$. Because the upper holding element 16 assumes different inclined positions in response to the movement of the linkage 18 between the rear position and the front position, the directions of movement $v_1$ and $v_2$ and the directions of movement $z_1$ and $z_2$ differ from one another in positions that differ from the middle position.

Figure 12:
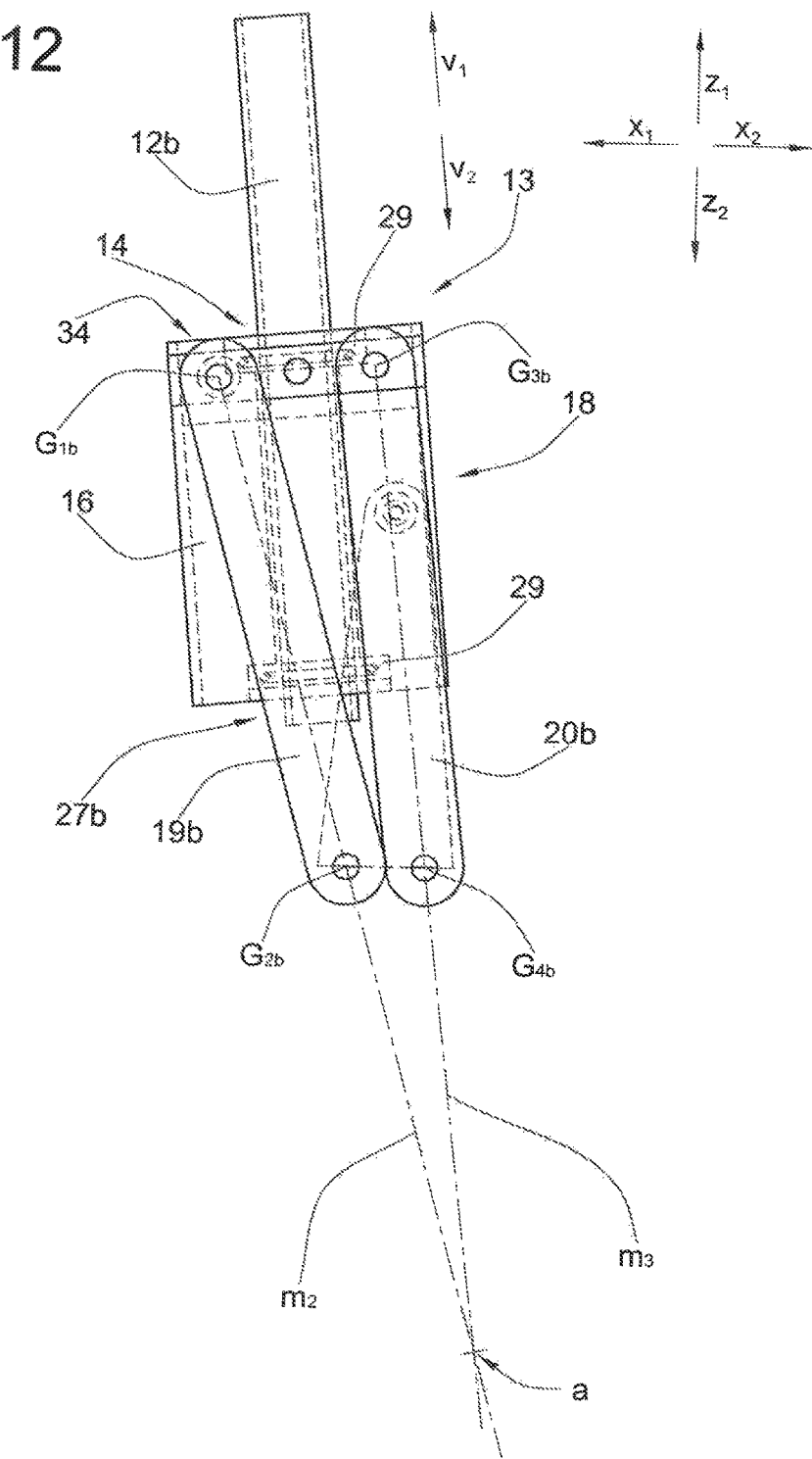
FIG. 12 shows the mounting assembly as in FIG. 11, wherein the linkage is in the front position.
Figure 13:
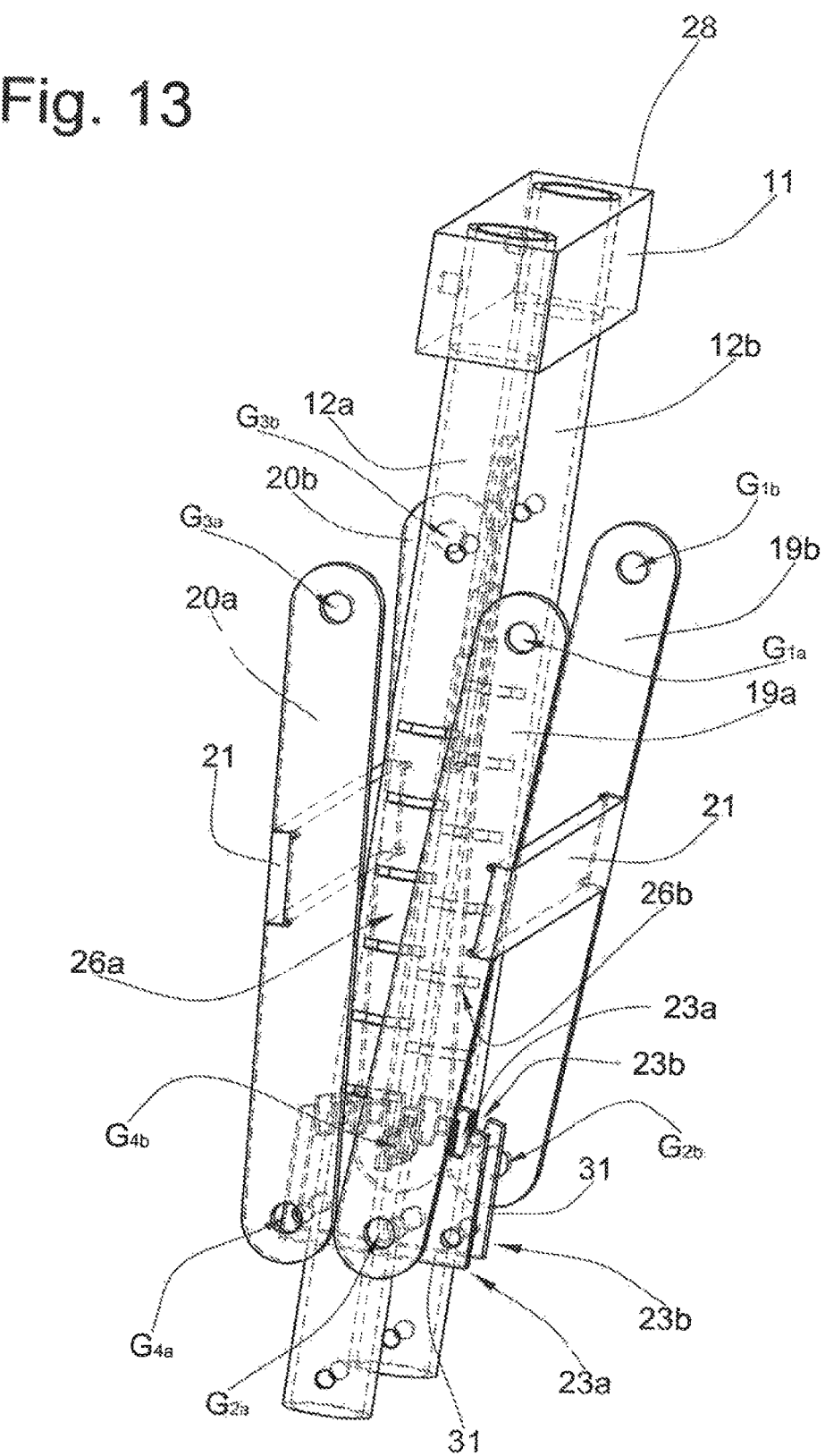
FIG. 13 is a perspective view of the headrest with mounting assembly, wherein the linkage is located in the front position, wherein the holding elements are not illustrated and wherein hidden lines are shown.

In response to their movement, the support bars 12a and 12b are guided by guides 29 formed in recesses 32 of the first holding element 16 (see FIGS. 11 and 12). The support bars 12a and 12b can be locked in the adjusted height position by a locking mechanism 25.

The locking mechanism 25 comprises an array 26a and 26b of notches 33 formed on each of the support bars 12a and 12b, and a locking element 30 fixedly accommodated in the first holding element 16 and which can be releasably engaged with one of the notches of the arrays 26a and 26b. In a locked position of the locking mechanism 25, the locking element 30 engages with one of the notches and the head support 11 is locked in the adjusted height position relative to at least one of the directions of movement $v_1$ and $v_2$. In an adjustment position, each locking element is disengaged from the notches. The head support 11 can then be moved into the directions $v_1$ and $v_2$—regardless of the position of the linkage 18.

An electrical drive can move the locking mechanism 25 between the locked position and the adjustment position and the displacement of the support bars 12a and 12b between the lower position and the upper position.

The invention claimed is:

1. A headrest for a vehicle seat, the headrest comprising:
   a head support;
   a mounting assembly carrying the head support on the vehicle seat and comprising a four-pivot linkage having an upper holding element on the head support and a lower holding element fixed to the seat; and
   first and second links interconnecting the upper holding element at respective first and second upper pivots on the upper holding element and the lower holding element at respective first and second lower pivots on the lower holding element such that the four-pivot linkage can shift the head support relative to the vehicle seat between a front position moved forward toward the head of a seat occupant, and a rear position moved backward therefrom, the upper pivots being at a different relative horizontal spacing on the upper holding element than the lower pivots on the lower holding element such that the linkage is trapezoidal.

2. The headrest according to claim 1, wherein there are two of the linkages, the upper holding element and the lower holding element each being part of one of the four-pivot linkages and of the other of the four-pivot linkages.

3. The headrest according to claim 1, further comprising:
a latch that can lock the upper holding element in different positions in response to movement between the front position and the rear position.

4. The headrest according to claim 1, further comprising:
height-adjusting means for moving the head support relative to the vehicle seat between an upper position and a lower position.

5. The headrest according to claim 4 wherein the height-adjusting means comprises at least one support bar connected to the head support and at least one guide on the upper holding element, for storing and guiding the support bar.

6. The headrest according to claim 1, further comprising:
a locking mechanism that can lock the head support relative to the vehicle seat in different height positions.

7. The headrest according to claim 6, wherein the locking mechanism has a first locking structure on the first holding element, and a second locking structure on the head support, the first and second locking structures being releasably engaged.

8. The headrest according to claim 1 wherein the lower pivots are closer than the upper pivots.

* * * * *